July 17, 1951  C. A. MUNDEL  2,560,589
PITCH DIAMETER GAUGE FOR EXTERNAL SCREW THREADS
Filed Jan. 8, 1946  2 Sheets-Sheet 1
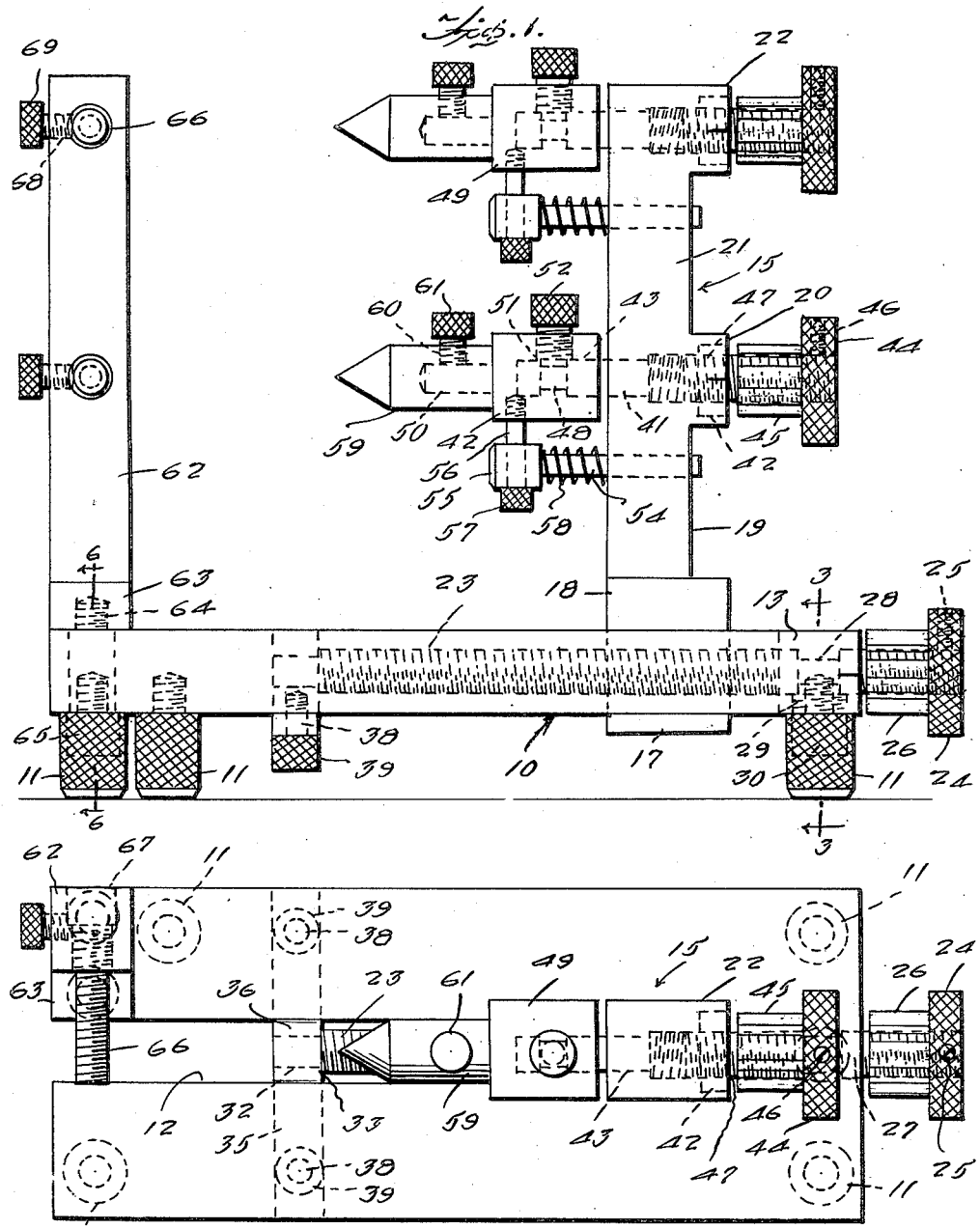
Inventor
Cornelius A. Mundel
Attorneys

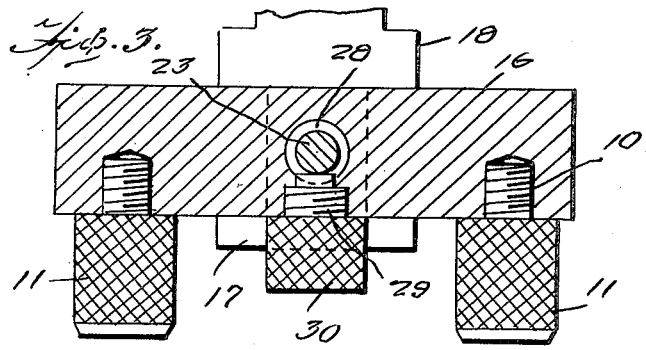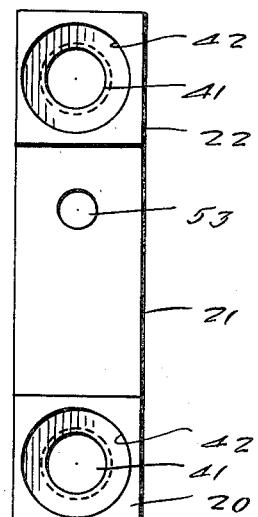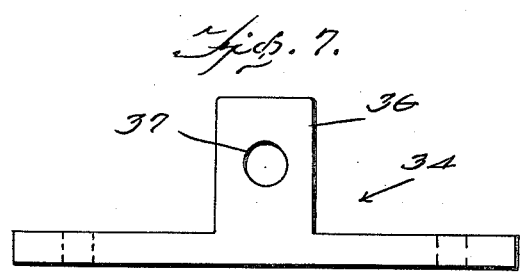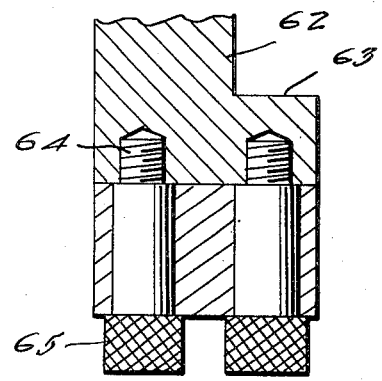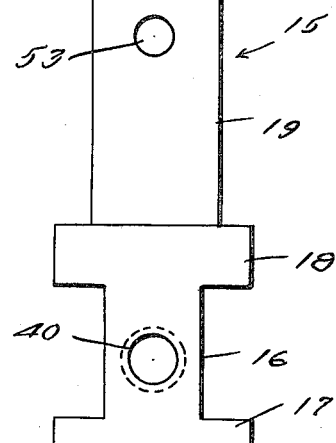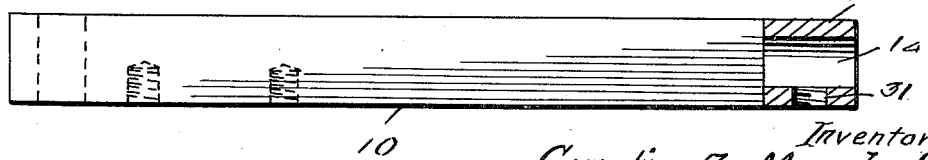

Patented July 17, 1951

2,560,589

UNITED STATES PATENT OFFICE 2,560,589

PITCH DIAMETER GAUGE FOR EXTERNAL SCREW THREADS

Cornelius A. Mundel, St. Louis, Mo.

Application January 8, 1946, Serial No. 639,812

4 Claims. (Cl. 33—199)

My invention relates to gauges and more particularly to gauges for measuring the pitch diameters of external screw threads.

The object of my invention is to provide a gauge for inspecting screws to prevent the passing of screws with too big or too small pitch diameters or, in other words, to provide a go and no-go gauge for external screw threads.

Another object of my invention is to provide a gauge for external screw threads having means for selectively adjusting the permitted clearance of loosely fitting screws.

A still further object of my invention is to make it possible to use one gauge for measuring different kinds of external threads such as American, British, Whitworth, etc., by a simple exchange of a few parts.

Other objects of my invention may appear in the following specification describing my invention with reference to the accompanying drawings illustrating a preferred embodiment of my invention. It is, however, to be understood that my invention is not to be limited or restricted to the exact construction and combination of parts described in the specification and shown in the drawings, but that such changes and modifications can be made which fall within the scope of the claims appended hereto.

In the drawings:

Figure 1 is a side elevation of a gauge according to my invention.

Figure 2 is a top view of the gauge shown in Figure 1.

Figure 3 is a sectional view taken on line 3—3 in Figure 1.

Figure 4 is an elevational front view of a movable tool carrier forming one element of the gauge, according to my invention.

Figure 5 is a sectional view taken on the vertical centerplane of the base of the gauge shown in Figure 1.

Figure 6 is a fragmentary sectional view taken on line 6—6 in Figure 1 showing the connection between the base of the gauge and a stationary tool carrier forming a part of the gauge, and Figure 7 is an end elevation of a spindle support used in connection with the gauge according to my invention.

Figures 3, 4, 6, and 7 are shown on an enlarged scale.

Referring in detail to the drawings the gauge according to my invention has a base 10 which rests on four legs 11 screwed into the base from below. The base has a substantially rectangular shape having a centrally located and longitudinally extending slot 12 therein. Adjacent its front end a bridge portion 13 is left and in this a horizontally arranged hole 14 is provided concentrically with the slot 12.

A movable tool carrier 15 is slidably mounted on said base 10. It has adjacent its lower end a neck portion 16 having a sliding fit in the slot 12. The part of the movable tool carrier 15, located below the base, extends at both sides beyond the slot forming a lower guide 17, and the portion of the movable tool carrier 15 right above the base 10 extends laterally as far as the guide 17 and forms an upper guide 18. The distance between the two guides is such that the base has a sliding fit between them. The entire part of the movable tool carrier 15 above the upper guide 18 is narrower than this guide but wider than the neck portion 16. The part directly above the upper guide is somewhat thinner than the two guides and the neck as shown at 19. On approximately the longitudinal center portion of the movable tool carrier 15 a square boss 20 is formed and extends forwardly thereof so that this central portion is approximately as thick as the neck portion 16. Above the square boss 20 a reduced portion 21 has the same thickness as portion 19 and on the top end of the movable tool carrier 15 a second square boss 22 is formed making this portion as thick as the portion 20.

A horizontal spindle 23 extends through the hole 14 in the bridge 13. On the part of the spindle extending outside of the base 10 a knurled hand knob 24 is fastened in any desired and convenient manner, for instance, as shown in Figure 1, by engaging the spindle threadedly and being secured thereon by a set screw 25. The circumference of the neck 26 of the hand knob 24 is graduated in 100 equal divisions in a well known manner, and on the top of the bridge 13 a center line 27 is provided by milling, etching or the like to cooperate with the graduations on the neck 26 of the knob 24.

Centrally of the spindle portion extending through the horizontal hole 14 a circumferential groove 28 is provided in the spindle 23 and a vertical screw 29 having a head 30 and extending through a threaded hole 31 in the bridge 13 is adapted to engage said groove 28, permitting rotary movement of the spindle 23 but preventing axial movement thereof.

The free end 32 of the spindle 23 is of reduced diameter and forms a shoulder 33 on the spindle. A spindle support 34 has a base portion 35 and a bearing portion 36. The base portion 35 is arranged transversely of and underneath the base 10, so that the bearing portion 36 will extend upwardly into the slot 12. The bearing portion fits closely into the slot and has a bearing hole 37 therein exactly coaxial with the hole 14 in the bridge 13 and adapted to receive the reduced portion 32 of the spindle 23 rotatably therein. The spindle support 34 is fastened to the base 10 by means of screws 38 having knurled heads 39, so that axial movement of the spindle 23 to the left is prevented but free rotary movement is permitted.

The spindle 23 between the shoulder 33 and the circumferential groove 28 is provided with one half of one inch thread by ten threads to the inch, and the movable tool carrier 15 has in its neck portion 19 a correspondingly threaded hole 40 which is arranged coaxially with the holes 14 and 37 in the bridge 13 and the spindle support 34 respectively, to receive the spindle 23 when the movable tool carrier is located in the slot 12.

Centrally of each of the square bosses 20 and 22 on the movable tool carrier 15 a threaded hole 41 extends through said carrier and is counterbored at its forward end as shown at 42.

These threads are one half of one inch by twenty threads to the inch.

Attention is called here to the fact that while here as well as in the case of the spindle for the movable carrier a specific thread is named any other desired and convenient size of thread may be used.

Two horizontally movable studs 43 have on their forward ends threads corresponding to those of the holes 41. These studs extend forwardly of the bosses 20 and 22, and hand knobs 44 having necks 45 are firmly mounted on said studs and secured thereon by set screws 46.

The circumferences of the necks 45 of the knobs 44 are graduated in fifty equal divisions etched, milled or otherwise marked thereon, and a centerline 47 is etched or milled on the sides or the tops of the bosses 20 and 22 to cooperate with the graduations on the necks 45.

The rearward ends of the studs 43 are of somewhat smaller diameter than the threaded forward ends, and they have each a circumferential groove 48 therein and extend beyond the movable tool carrier. When the studs 43 are screwed into the holes 41 the necks 45 can be received by the counterbores 42.

For each stud 43 an alignment element 49 is provided. These elements have a rectangular longitudinal section and a square transverse cross section. Each element 49 has a forwardly extending central bore to receive the rearward end of the corresponding stud 43 rotatably therein. On its rearward end each element has a centrally located cylindrical extension 50. A screw 51 extends through a threaded hole in each of the elements 42 and engages the corresponding groove 48 in the stud 43, permitting rotary movement of the stud in said element but preventing axial movement of said parts relative to each other.

At a distance below each boss 20 and 22 and on the transverse centerline of the movable tool carrier 15 a horizontal hole 53 extends fore and aft through said carrier. In each of said holes an alignment rod 54 is slidably arranged. Each rod has a head 55 having a screw 56 extending upwardly therethrough. Each screw 56 has a knurled head 57 and engages a threaded hole in the lower surface of the corresponding alignment element 49. A spiral spring 58 is arranged between the head 55 of each alignment rod 54 and the rear surface of the movable tool carrier 15 for the purpose of reinforcing and stiffening the alignment parts.

A substantially cylindrical horizontal measuring tool 59 has a central bore therein adapting said tool to be slidably mounted on the cylindrical extension 50 of the alignment element 49. There is one measuring tool for each element 49. The rearward end of the tool is conically shaped and the apex angle in the illustrated embodiment is 60°. It is, however, to be understood that tools having different apex angles can be used to fit any screw thread to be checked. Set screws 60 having knurled heads 61 engage threaded holes in the measuring tools 59 and secure the same on the cylindrical extension 50. The tools are hardened and ground.

A stationary tool carrier 62 has a foot portion 63 and is firmly but removably fastened to the top of the base 10 by means of screws 64 threadedly engaging holes in the foot portion 63 extending through holes in the base 10 and having knurled heads 65.

The stationary tool carrier 62 is fastened on the base 10 so that it extends upwardly therefrom and that the end surface of its foot portion 62 coincides with the inner face of one of the prongs formed by the slot 12 extending longitudinally into the base 10.

Two hardened and ground external thread gauges 66 are removably arranged in threaded horizontal holes in the stationary tool carrier 62 so that they extend over and across the slot 12 in the base 10. A slot 67 is provided in the head end of said gauges 66 for adjustment purposes. The gauges 66 are placed at such levels that their horizontal center planes coincide with the horizontal planes of the measuring tools 59.

The gauges 66 are held in adjusted position by set screws 68 having knurled heads 69.

To adjust the setting of the gauges 66, the movable tool carrier 15 will be moved rearwardly until the points of the measuring tools 59 will engage the gauges 66. Said gauges will be moved across the face of the movable carrier 15 by means of a screw driver engaging slot 67 therein, until the points of the measuring tools 59 will exactly coincide with the inner thread surface of the gauges 66. Then the set screws 69 will be tightened to secure the gauges 66 in adjusted position.

By rotating the spindle 23 by means of the knob 24 the tool carrier 15 and the tools thereon are moved far enough away from the gauges 66 that a screw to be checked can be inserted between the gauges 66 and the measuring tool 59. One of the sets of tools 59 and gauges 66 can then be adjusted by the fine adjustment stud 43 to permit a screw to pass, that has the exact demanded pitch diameter. The other set is then adjusted by the same means for the permitted clearance for a loose fit. Any threaded part that does not pass the first adjusted set is oversize and any part that will pass the second set is undersize.

In this manner externally threaded parts can be checked inside a predetermined limit of clearance.

Having described my invention what I claim and desire to secure by Letters Patent is:

1. A screw-thread gauge device comprising a horizontal support member, a first upstanding post element carried by said support member in a longitudinal vertical plane of said support member, means for adjusting the position of said first upstanding post element longitudinally in said longitudinal vertical plane, a horizontal tool element provided with a conical end carried by said post element and extending in said longitudinal vertical plane, a second upstanding post element carried by said support member laterally offset from said longitudinal vertical plane, and a horizontal gauge screw carried by said second post element, said gauge screw extending normally to and intersecting said vertical longitudinal plane and being located in the same horizontal plane as said tool element.

2. A screw-thread gauge device comprising a horizontal support member, a first upstanding post element carried by said support member in the median longitudinal vertical plane of said support member, means for adjusting the position of said first upstanding post element longitudinally in said median longitudinal vertical plane, a horizontal tool element provided with a conical end carried by said post element and extending in said median longitudinal vertical plane, a second upstanding post element carried by said support element laterally offset from said median longitudinal vertical plane, and a horizontal gauge screw carried by said second post element, said gauge screw extending normally to and intersecting said median vertical longitudinal plane and being located in the same horizontal plane as said tool element.

3. A screw-thread gauge device comprising a horizontal support member, a first upstanding post element carried by said support member in a longitudinal vertical plane of said support member, means for adjusting the position of said first upstanding post element longitudinally in said longitudinal vertical plane, a horizontal tool element provided with a conical end threadedly engaged with said post element and extending in said longitudinal vertical plane, a second upstanding post element carired by said support element and laterally offset from said longitudinal vertical plane, and a horizontal gauge screw threadedly engaged with said second post element, said gauge screw extending normally to and intersecting said vertical longitudinal plane and being located in the same horizontal plane as said tool element.

4. A screw-threaded gauge device comprising a horizontal support member formed with a median longitudinal slot, a first upstanding post element slidably engaged in said slot, a horizontal screw rotatably carried by said horizontal support member and extending axially in said slot, said screw being threadedly engaged with said post element, whereby the post element may be longitudinally adjusted in said slot, a horizontal tool element provided with a conical point carried by said post element in the vertical longitudinal plane of said slot, a second upstanding post element carried by said support member laterally offset from the vertical longitudinal plane of said slot, and a horizontal gauge screw carried by said second post element, said gauge screw extending normally to and intersecting the longitudinal vertical plane of the slot and being located in the same horizontal plane as said tool element.

CORNELIUS A. MUNDEL.

REFERENCES CITED

The following references are of record in the file of this patent:

UNITED STATES PATENTS

| Number | Name | Date |
|---|---|---|
| 1,394,650 | Thomas | Oct. 25, 1921 |
| 1,499,729 | Hanson | July 1, 1924 |
| 2,210,561 | Allen et al. | Aug. 6, 1940 |
| 2,212,884 | Polasik | Aug. 27, 1940 |

FOREIGN PATENTS

| Number | Country | Date |
|---|---|---|
| 518,696 | France | Jan. 8, 1921 |